Jan. 2, 1934.  T. W. HALLERBERG  1,942,097
CONTROL FOR PRESSURE FEED LUBRICATING SYSTEMS.
Filed July 2, 1932
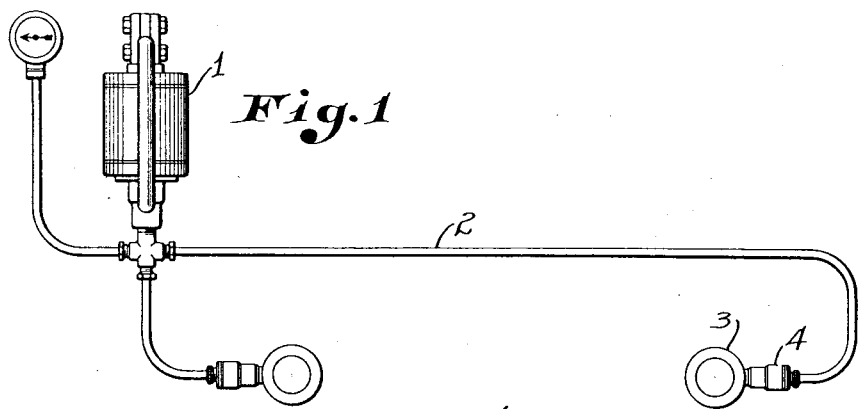
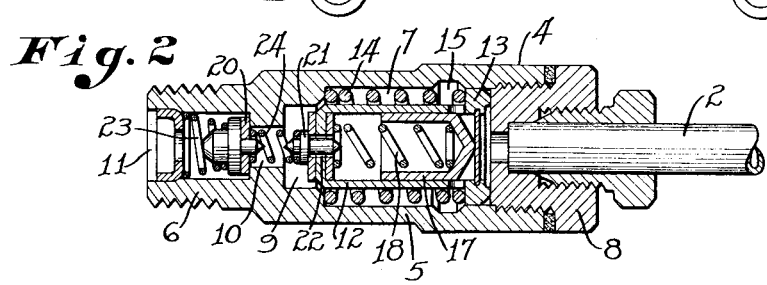
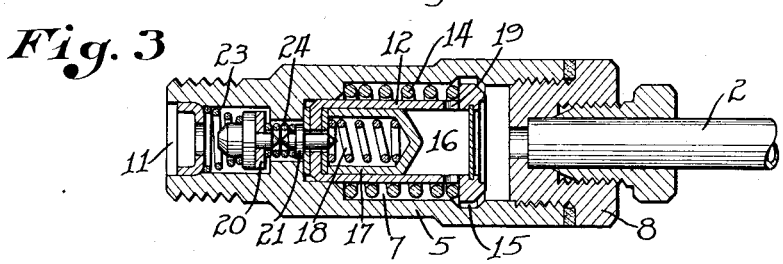
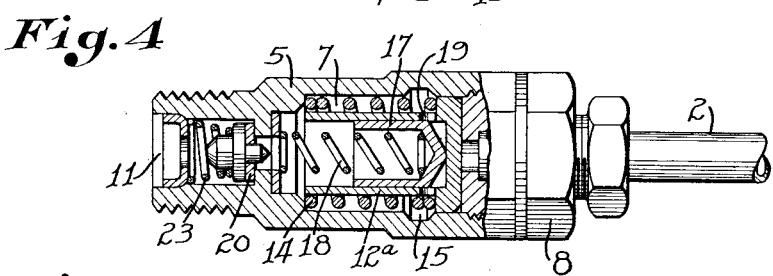
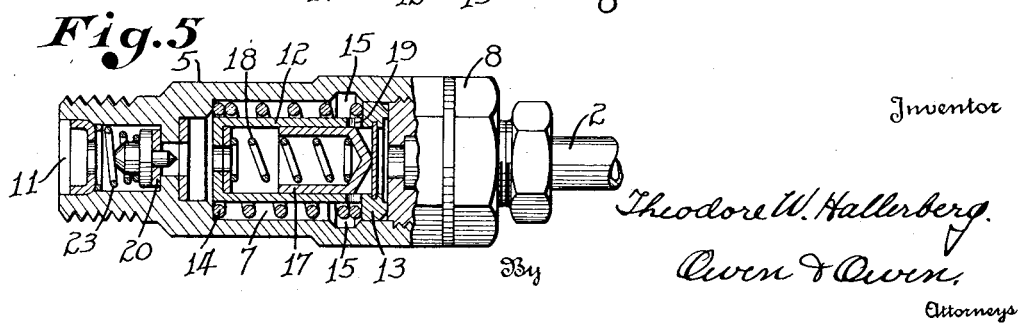
Inventor
Theodore W. Hallerberg.
By Owen & Owen
Attorneys Patented Jan. 2, 1934

1,942,097

UNITED STATES PATENT OFFICE 1,942,097

CONTROL FOR PRESSURE FEED LUBRICATING SYSTEMS

Theodore W. Hallerberg, Madison, Wis., assignor to The Commerce Guardian Bank, trustee, Toledo, Ohio, a corporation of Ohio Application July 2, 1932. Serial No. 620,717

19 Claims. (Cl. 184—7)

This invention relates particularly to control means for lubricating systems of the centralized pressure feed type, and has for its object the provision of a control means of this character having dual piston members compactly arranged in telescoping relation and cooperating to perform certain predetermined functions in the controlled supply of lubricant to associated bearing parts.

The invention is fully described in the following specification, and several embodiments thereof illustrated in the accompanying drawing, in which—

Figure 1 is a diagrammatic illustration of a lubricant pressure feed system embodying the invention. Fig. 2 is an enlarged central longitudinal section of a control unit embodying the preferred form of the present invention with the parts in normal position. Fig. 3 is a similar view with the piston members in the extreme forward position which they assume when lubricant under pressure is supplied to the unit. Figs. 4 and 5 are similar sectional views of different modified forms of the invention with the parts in normal position and with parts in full.

Referring to the drawing, 1 designates a lubricant pressure supply source, or lubricant pump, having one or more discharge lines 2, each in communication with one or more bearings 3 to be lubricated through respective control means 4 embodying the invention.

The control means embodying the preferred form of the invention and illustrated in Figs. 2 and 3 comprises a shell or housing 5 having a nipple 6 at one end for threading into the lubricant receiving opening of a bearing housing. The shell 5 has a cylindrical chamber 7, which may be termed a valve-chamber, closed at its outer end by, in the present instance, a plug 8 having a lubricant supply opening axially therethrough to which a supply pipe 2 is connected in any suitable manner. The inner end of the chamber 6 is provided with a reduced bore 9 forming a pressure chamber concentric to the bore of the chamber 7 and having communication at its bottom or inner end through a reduced passage 10 with the passage or bore 11 of the nipple 6.

A primary plunger 12, in the present instance of a diameter corresponding to that of the reduced bore 9, is mounted in the chamber 7 and extends substantially from the one end to the other of said chamber and is provided at its outer end with an annular valve head or enlargement 13 fitting the bore of the chamber for reciprocatory sliding movements therein. A coiled expansion spring 14 is interposed between the bottom of the chamber 7 and head 13 in surrounding relation to the plunger 12 and acts to normally retain such head in stop coaction with the inner end of the plug 8, or other suitable coacting stop provided in the outer end of the chamber. When the plunger 12 is in its normal retracted position, as shown in Fig. 2, a restricted communication is provided between the lower end of the portion of the chamber 7, which surrounds the plunger 12, and the reduced bore 9, so that any lubricant in the chamber around the plunger may pass into the bore 9 and thence through the nipple passages 10 and 11 into the associated bearing.

The wall of the chamber 7 near its outer end is provided with an annular recess 15, the side walls of which are preferably tapered to provide the recess with a broadened mouth portion and this recess is so positioned with respect to the valve head 13 that when the plunger is moved to the limit of its inward or pressure stroke with the inner end of the plunger fitting into the bore 9, said head will register with the recess 15, as shown in Fig. 3, so that lubricant supplied to the inner end of the cylinder 7 from the supply line 2 may pass around the head to the inner or forward side thereof, but such lubricant, when the plunger is in this position, cannot pass from the inner end of the cylinder due to the closing of the passage through the bore 9 by the plunger.

The plunger 12 is provided interiorly with a chamber 16 in which a plunger 17, which may be termed the secondary plunger of the unit, is mounted for reciprocatory movements, being normally held in the rear or headed end portion of the plunger 12 by a coiled expansion spring 18 mounted in the hollow of the plunger 17 and having its inner end thrust against the inner end of the chamber 16. The chamber 16 has communication at its rear end through one or more ports 19 with the chamber 7 immediately at the forward side of the head 13, thus permitting lubricant which is forced into the chamber 7 at the forward side of the head 13 to enter the chamber 16, force the plunger 17 to the limit of its inward stroke and thus provide a secondary charge or supply of lubricant within the primary plunger 12. It is apparent that when the lubricant supplying pressure is relieved in the supply line, the primary plunger 12, under the action of the spring 14, will first return to its normal position, shown in Fig. 2, opening communication between the forward end of the chamber and the associated bearing, thus permitting the secondary plunger 17 under the action of its spring 18 to move rearward, replacing lubricant in chamber 9 and forcing an additional measured quantity of lubricant to the associated bearing. The spring 14 exerts approximately twice the pressure per square inch upon plunger 12 than spring 18 exerts upon plunger 17.

A check-valve 20 is mounted in the nipple 6 and adapted to close under a backward or outward pressure therein. An outwardly opening check-valve 21 is also provided at the inner end of the plunger 12 to normally close a relief passage 22 from the forward end of the interior chamber of the plunger 12, so that any seepage of lubricant around the piston 17 to the forward end of said chamber may be forced therefrom through the passage 22 by a forward movement of the plunger 17. In the present instance, the check-valve 20 is held to its seat by a spring 23, and the check-valve 21 is held to its seat by a spring 24, which latter is interposed between the two check-valves in engagement therewith.

In the operation of this form of the invention, lubricant under high pressure, say approximately 1000 lbs., is forced into the control unit 4 through the supply line 2 and first acts against the rear end of the primary plunger 12 to force it to the forward end of its stroke, thus causing the forward end of the plunger to enter and move forward a predetermined distance in the restricted or pressure portion 9 of the plunger chamber and the annular valve-head or flange portion 13 to move into full register with the recess or by-pass channel 15, thus closing the communication between the chamber 7 and associated bearing and open-communication between the supply line and said chamber at the forward side of the valve member 13. The supply pressure of the lubricant causes plunger 12 to move to the left, first closing communication between chamber 7 and chamber 9, then forcing lubricant in chamber 9 out into the associated bearing, and finally opening communication between the chambers 7 and 16 with the supply line 2, thereby filling chamber 16 and forcing the plunger 17 outward against the tension of the spring 18. The forward movement of the plunger 12 in the restricted portion 9 of the chamber 7 causes an initial high-pressure discharge into the associated bearing of a measured quantity of lubricant, determined by the amount of lubricant in said reduced portion 9. When the plunger 12 has been relieved of the lubricant supply pressure, it is returned by the spring 14 to its normal position, shown in Fig. 2, to effect a closing of the communication between the supply source and the chamber 7 at the forward side of the head or valve member 13, and also opens communication at the forward end of the plunger between the chambers 7 and 9, thus permitting lubricant in the chambers 7 and 16 to rush into the pressure chamber 9 to fill the void left therein by the rearward movement of the plunger. The plunger 17, under the influence of the spring 18, first replaces lubricant in chamber 9, which space holds a vacuum due to check-valve 20 preventing plunger 12 from rushing back, then acts to effect a further measured low pressure discharge of lubricant into the chamber 7 through the ports 19 and thence to the bearing. The tension of the spring 18 is preferably such that the secondary charge of lubricant to the bearing is at approximately 100 lbs.

The construction of the control units shown in Figs. 4 and 5 is substantially the same as that of the control unit above-described, except that the forward side of the secondary plunger (the one acting in the outer or primary plunger) is in communication with the bearing through the check-valve in the shell nipple, so that in this form, the unit operates to supply a measured high pressure charge of lubricant to the bearing, but not a secondary low pressure charge. In the form shown in Fig. 4, the primary plunger, which is designated "12a" is of the same general construction as in Figs. 2 and 3, except that its forward end is entirely open and the spring 18 for the secondary plunger 17 has its forward end thrust against the bottom of the reduced portion 9 of the cylinder bore.

In Fig. 5, the construction is substantially the same as in Figs. 2 and 3, except that the check-valve is omitted from the passage 22 in the forward end of the primary plunger.

In both forms shown in Figs. 4 and 5, the forward movement of the plungers under the lubricant supply pressure causes the high pressure discharge of a measured quantity of lubricant to the associated bearing, but upon the return of the primary plunger to its normal position, the lubricant stored in the primary plunger and acted on by the rearward movement of the plunger 17 will merely be forced from one side to the other of such plunger instead of being forced into the bearing, or in other words, the void made in the shell by the lubricant discharged into the bearing will be filled by lubricant from the right hand side of the secondary plunger when the plungers have returned to their normal position.

It is apparent that I have provided a simple and compact form of control for lubricant pressure supply lines, which, in all three forms illustrated, will effect a measured high pressure discharge of lubricant to the associated bearing when the primary plunger is moved forward by the pressure supply force, and upon the return of the primary plunger to normal position, will operate to replace, at the forward side of the plungers, the lubricant which was forced into the bearing by the high pressure charge movement of the plunger. In addition to this, the outward movement of the secondary or inner plunger in the form shown in Figs. 2 and 3 under the action of the spring 18, causes a quantity of lubricant, which is measured by the capacity of the chamber 16, to be forced to the bearing under a comparatively low pressure when the void in the shell created by the rearward movement of the plunger 12 has been filled. This second low pressure charge action of the unit is due to the communication between the chamber 16 and bearing supply passage 9, 10, at the forward side of the plunger 17 being closed by the check-valve 21, so that the lubricant is not merely transferred from one end to the other of the chamber 16 by a by-pass action.

I wish it understood that my invention is not limited to any specific construction, arrangemet or form of the parts, as it is capable of numerous modications and changes without departing from the spirit of the claims.

Having thus described my invention, what I claim as new, and desire to secure by United States Letters Patent, is:

1. In a lubricating line, means operable by feeding pressure in the line to supply an initial high pressure charge to a part to be lubricated, and means telescoped within said first means and automatically operable to subsequently supply a predetermined low pressure charge to such part.

2. In a lubricating line, a measuring valve of piston displacement type operable by feeding pressure in the line to supply a predetermined initial high pressure charge to a part to be lubricated, and means disposed in said valve and automatically operable to subsequently supply a predetermined low pressure charge to such part.

3. In a lubricating line, means operable by feeding pressure in the line to supply an initial high pressure charge of lubricant to a part to be lubricated and then to return to a normal position, and means disposed in said first means and automatically operable upon a predetermined movement of said first means to supply a low pressure charge of lubricant to such part.

4. In a lubricating line, a primary lubricant supply chamber to which lubricant is supplied from said line, means in said chamber operable by feeding pressure in the line to effect an initial high pressure supply of a measured quantity of lubricant from said chamber to a part to be lubricated, said means having a secondary supply chamber therein in communication with said primary chamber, and means in said secondary chamber operable to supply a low pressure charge of lubricant to said part from the secondary chamber.

5. In a pressure feed lubricating line, means forming a primary chamber to which lubricant is supplied from the line and having an outlet, a piston having a secondary chamber therein in communication with the primary chamber, said piston normally disposed in one position in said chamber and when in such position cooperating with said means to close communication between the supply line and both said secondary chamber and outlet, said piston being movable by supply line pressure to eject a high pressure charge of lubricant through said outlet, close the communication between the primary chamber and outlet and open the communication between said supply line and both said primary and secondary chambers, and means in said secondary chamber automatically operable to force lubricant under predetermined pressure therefrom into said primary chamber when the supply pressure is relieved.

6. A control of the class described including means forming a passage with inlet and outlet openings, a hollow piston valve in said passage between said openings forming an interior secondary chamber and cooperating with said means to form a primary chamber, said chambers being in communication, said valve being movable from normal position by lubricant feeding pressure in the inlet to effect a measured lubricant discharge from the outlet and to close the communication between the primary chamber and outlet and open the communication between the inlet and secondary chamber, said valve when in normal position closing the communication between the inlet and secondary chamber and opening the communication between the secondary chamber and outlet, means for returning and yieldingly retaining the valve in normal position, and means in the valve automatically operable to discharge lubricant from the secondary chamber under predetermined pressure.

7. In a lubricant supply line, a control unit having a chamber therein with an inlet and an outlet at opposite ends each in communication with the supply line, a plunger working in said chamber and having a valve portion normally closing communication between the inlet and outlet end portions of the chamber, said plunger having a secondary chamber therein in communication with said first chamber at the discharge side of said valve portion and being movable by feeding pressure in the supply line to eject a charge of lubricant from the outlet end of said chamber and to open communication between portions of said chamber separated by said valve portion, means operable to normally move the plunger to close said last communication and open communication between said chamber and outlet, and a secondary plunger carried by and movable in said first plunger to force lubricant therefrom into said first chamber.

8. The combination with a lubricant supply line, of a control unit therein having a passage therethrough with an inlet and an outlet at opposite ends each in communication with said line, a plunger-type of valve in said passage cooperating therewith to form a primary chamber and normally standing in position to open said chamber to the outlet and close it to the inlet and movable by feeding pressure in the inlet side of the line to reverse said order, said valve having a second chamber therein in open communication with said primary chamber, and means in said second chamber movable in one direction therein by lubricant when the primary chamber is open to the inlet and automatically operable to force lubricant therefrom into the primary chamber when the primary chamber is open to said outlet.

9. In combination, a lubricant supply line, a control unit therein having a passage therethrough with an inlet and an outlet at opposite ends each in communication with said line, a plunger-type of valve in said passage cooperating therewith to form a primary chamber and normally movable to position to open said chamber to the outlet and close it to the inlet and movable by feeding pressure in the inlet to reverse said order and eject a predetermined charge of lubricant from the outlet, means effecting the normal movement of said valve, said valve having a secondary lubricant chamber therein in open communication with the primary chamber, and means in said secondary chamber movable in one direction therein by lubricant under feeding pressure from the primary chamber and movable by spring pressure in the opposite direction to force lubricant therefrom into the primary chamber when the valve is in normal position.

10. The combination with a lubricant supply line, of a control unit therein having a passage therethrough with an inlet and an outlet at opposite ends each in communication with said line, a plunger-type of valve in said passage cooperating therewith to form a primary chamber and normally standing in position to open said chamber to the outlet and close it to the inlet and movable by feeding pressure in the inlet side of the line to reverse said order, said valve having a second chamber therein in open communication with said primary chamber, and means in said second chamber movable in one direction therein by lubricant when the primary chamber is open to the inlet and automatically operable to force lubricant therefrom into the primary chamber when the primary chamber is open to said outlet, said secondary chamber being closed to the outlet except through the primary chamber.

11. In combination, a lubricant supply line, a control unit therein having a passage therethrough with an inlet and an outlet at opposite ends each in communication with said line, a plunger-type of valve in said passage cooperating therewith to form a primary chamber and normally movable to position to open said chamber to the outlet and close it to the inlet and movable by feeding pressure in the inlet to reverse said order and eject a predetermined charge of lubricant from the outlet, means effecting the normal movement of said valve, said valve having a secondary lubricant chamber therein in open communication with the primary chamber, and means in said secondary chamber movable in one direction therein by lubricant under feeding pressure from the primary chamber and movably by spring pressure in the opposite direction to force lubricant therefrom into the primary chamber when the valve is in normal position, said secondary chamber being closed to the outlet except through the primary chamber.

12. A control unit for insertion into a pressure feed lubricant supply line, said unit having a passage therethrough with an inlet and an outlet at opposite ends each in communication with the line in which inserted, a plunger-type of valve in said passage cooperating therewith to form a primary chamber, the wall of said passage having a by-pass, said valve being movable by feeding pressure in the inlet to effect an ejection of lubricant from the outlet and to close said chamber to the outlet and open it to the inlet through said by-pass, means acting on the vlave to normally move it to position to open the chamber to the outlet and close it to the inlet, said valve having means therein for receiving a charge of lubricant from the primary chamber under feed line pressure and to eject the lubricant therefrom into the primary chamber when the feed line pressure is discontinued.

13. A control unit for insertion into a pressure feed lubricant supply line, said unit having a passage therethrough with an inlet and an outlet at opposite ends each in communication with the line in which inserted, a plunger-type of valve in said passage cooperating therewith to form a primary chamber and normally standing in position to open said chamber to the outlet and close it to the inlet and movable by feeding pressure through the inlet to reverse said order, said valve including a secondary chamber in communication with the primary chamber and into which a quantity of lubricant is forced when feeding pressure is present in the inlet, and means carried by the valve for forcing lubricant from the secondary chamber into the primary chamber when the feeding pressure is relieved and an outwardly opening check-valve in said outlet.

14. A control unit for insertion into a pressure feed lubricant supply line, said unit having a passage therethrough with an inlet and an outlet at opposite ends each in communication with the line in which inserted, a plunger-type of valve in said passage cooperating therewith to form a primary chamber and normally standing in position to open said chamber to the outlet and close it to the inlet and movable by feeding pressure through the inlet to reverse said order, said valve including a secondary chamber in communication with the primary chamber and into which a quantity of lubricant is forced when feeding pressure is present in the inlet, and means carried by the valve for forcing lubricant from the secondary chamber into the primary chamber when the feeding pressure is relieved and thence under pressure through said outlet.

15. A control unit for insertion into a pressure feed lubricant supply line, said unit having a passage therethrough with an inlet and an outlet at opposite ends each in communication with the line in which inserted, a plunger-type of valve in said passage cooperating therewith to form a primary chamber and normally standing in position to open said chamber to the outlet and close it to the inlet and movable by feeding pressure through the inlet to reverse said order, said valve including a secondary chamber in communication with the primary chamber and into which a quantity of lubricant is forced when feeding pressure is present in the inlet, and means carried by the valve for forcing lubricant from the secondary chamber into the primary chamber when the feeding pressure is relieved and an outwardly opening check-valve in said outlet and outwardly opening check-valve control communication between the forward end of said secondary chamber and outlet.

16. A control means of the class described, having a passage therethrough with an inlet and an outlet at opposite ends, a plunger-type valve reciprocally movable in said passage between said inlet and outlet and cooperating with the passage to form a primary chamber, said valve being movable by lubricant supply feeding pressure in said inlet to close said chamber to the outlet and open it to the inlet, means yieldingly acting on said valve to move it to position to reverse said order, said valve including a secondary chamber in communication at one end with said inlet when the valve is in position to close the primary chamber to the outlet and also in communication with said primary chamber, outwardly opening check-valve control communication between the other end of said secondary chamber and the outlet, and a plunger in the secondary chamber between its ends and normally movable with predetermined force toward the inlet communicating end of the secondary chamber.

17. A control means for pressure feed lubricant systems having a passage with inlet and outlet ports, combination valve and plunger means disposed in the passage between said ports and cooperating with the passage to form a primary lubricant storage space, said last means movable by lubricant feeding pressure through the inlet port to position to close said space to the outlet port and open it to the inlet port and to eject a predetermined charge from the outlet port and automatically movable by spring pressure to reverse said order when the feeding pressure is relieved, said valve and plunger means having provision for carrying a secondary charge of lubricant which is supplied thereto when such means is in position to close said primary space to the outlet and is discharged therefrom when such means is in normal position.

18. A control means for pressure feed lubricant systems having a passage with inlet and outlet ports, combination valve and plunger means disposed in the passage between said ports and cooperating with the passage to form a primary lubricant storage space, said last means movable by lubricant feeding pressure through the inlet port to position to close said space to the outlet port and open it to the inlet port and to eject a predetermined charge from the outlet port and automatically movable by spring pressure to reverse said order when the feeding pressure is relieved, said valve and plunger means having provision for carrying a secondary charge of lubricant which is supplied thereto when said means is in position to close said primary space to the outlet, and means in said valve means to discharge lubricant therefrom to and through said outlet under predetermined pressure.

19. In a device of the class described, a lubricant feed line, a plunger in said line having a chamber therein and operable by pressure in the inlet side of the line to eject a predetermined charge of lubricant through the outlet side of the line, and to open communication between the inlet side of the line and the chamber to supply lubricant to the chamber from the line and then to return to a normal position, and piston means in said chamber subsequently operable to force a predetermined charge of lubricant from the chamber and through the discharge side of the line.

THEODORE W. HALLERBERG.